(12) United States Patent
Sharifi Mehr

(10) Patent No.: US 9,992,327 B1
(45) Date of Patent: Jun. 5, 2018

(54) INTERACTION LOCK MODE FOR MOBILE DEVICES

(71) Applicant: Amazon Technologies, Inc., Reno, WA (US)

(72) Inventor: Nima Sharifi Mehr, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 90 days.

(21) Appl. No.: 14/147,242

(22) Filed: Jan. 3, 2014

(51) Int. Cl.
*H04M 1/725* (2006.01)
*H04W 12/08* (2009.01)

(52) U.S. Cl.
CPC ....... *H04M 1/72577* (2013.01); *H04W 12/08* (2013.01)

(58) Field of Classification Search
CPC .............. H04M 1/72577; H04W 12/08; G06F 3/30481; G06F 3/0488
See application file for complete search history.

(56) References Cited

U.S. PATENT DOCUMENTS

| 9,047,453 | B2* | 6/2015 | Huang ..................... G06F 21/36 |
| 9,220,011 | B1* | 12/2015 | Annan ................... H04W 12/08 |
| 9,367,672 | B2* | 6/2016 | Eggerton ................ G06F 21/31 |
| 9,613,193 | B1* | 4/2017 | Harter ...................... G06F 21/31 |
| 2002/0007459 | A1* | 1/2002 | Cassista .................. H04M 1/67 726/3 |
| 2008/0058006 | A1* | 3/2008 | Ladouceur .......... H04M 1/0264 455/556.1 |
| 2010/0070926 | A1* | 3/2010 | Abanami .............. G06F 1/1626 715/835 |
| 2010/0099394 | A1* | 4/2010 | Hainzl ....................... G06F 1/32 455/418 |
| 2010/0146235 | A1* | 6/2010 | Weber .................... G06Q 30/06 711/165 |
| 2010/0248689 | A1* | 9/2010 | Teng ....................... H04M 1/67 455/411 |
| 2012/0066630 | A1* | 3/2012 | Kim ...................... G06F 3/0481 715/769 |
| 2012/0098639 | A1* | 4/2012 | Ijas ..................... G06F 3/04883 340/5.51 |
| 2012/0284673 | A1* | 11/2012 | Lamb .................. G06F 3/04883 715/863 |
| 2012/0284789 | A1* | 11/2012 | Kim ...................... G06F 1/1694 726/19 |
| 2012/0303476 | A1* | 11/2012 | Krzyzanowski .......... G06F 8/60 705/26.5 |
| 2013/0036377 | A1* | 2/2013 | Colley ................. G06F 3/0488 715/764 |
| 2013/0141349 | A1* | 6/2013 | Song ................... G06F 3/04883 345/173 |

(Continued)

*Primary Examiner* — Mehmood B. Khan
(74) *Attorney, Agent, or Firm* — Davis Wright Tremaine LLP

(57) ABSTRACT

A user of a mobile device selects data to be shared with other users and engages a lock button installed on the mobile device. As a result of engaging the lock button installed on the mobile device, one or more regions of a display unit installed on the mobile device may be disabled such that the other users cannot access other applications and data stored on the mobile device. If a user attempts to interact with the mobile device after the lock button has been engaged, the user is presented with a PIN input box. Accordingly, a user may input a PIN into the PIN input box that, if correct, causes the one or more regions of the display unit installed on the mobile device to be restored.

22 Claims, 8 Drawing Sheets

(56) References Cited

U.S. PATENT DOCUMENTS

| | | | |
|---|---|---|---|
| 2013/0222431 A1* | 8/2013 | Joo | G06F 3/0488 345/649 |
| 2013/0257590 A1* | 10/2013 | Kuenzi | G05B 1/01 340/5.65 |
| 2013/0293502 A1* | 11/2013 | Kitatani | G06F 3/0488 345/173 |
| 2013/0326582 A1* | 12/2013 | Kruzeniski | G06F 21/6209 726/2 |
| 2014/0026188 A1* | 1/2014 | Gubler | H04W 12/08 726/3 |
| 2014/0033326 A1* | 1/2014 | Chien | H04W 12/08 726/28 |
| 2014/0055235 A1* | 2/2014 | Choi | G07C 9/00023 340/5.28 |
| 2014/0164941 A1* | 6/2014 | Kim | G06F 21/36 715/741 |
| 2014/0189562 A1* | 7/2014 | Lee | G06F 3/048 715/771 |
| 2014/0282877 A1* | 9/2014 | Mahaffey | H04L 63/0853 726/3 |
| 2014/0283012 A1* | 9/2014 | Eggerton | G06F 21/31 726/19 |
| 2014/0359750 A1* | 12/2014 | Adams | G06F 21/74 726/16 |
| 2015/0007307 A1* | 1/2015 | Grimes | G09B 5/08 726/18 |
| 2015/0040024 A1* | 2/2015 | Higashibeppu | G06F 3/04883 715/741 |
| 2015/0058942 A1* | 2/2015 | Dermu | G06F 21/445 726/6 |
| 2015/0099480 A1* | 4/2015 | Reiter | H04M 1/72577 455/404.1 |
| 2015/0148005 A1* | 5/2015 | Chau | H04M 1/72569 455/410 |
| 2015/0186661 A1* | 7/2015 | Hirase | G06F 21/32 726/28 |
| 2016/0347281 A1* | 12/2016 | Wu | H02J 7/00 |
| 2017/0013431 A1* | 1/2017 | Wu | H04W 4/22 |

* cited by examiner

INTERACTION LOCK MODE FOR MOBILE DEVICES

BACKGROUND

Mobile devices, such as smartphones and tablet computers, have become increasingly popular for multiple use applications. For instance, a mobile device owner may allow other users to utilize his/her mobile device to view or listen to content specified by the owner. However, a mobile device owner may have legitimate privacy, confidentiality or integrity concerns regarding other content that may be stored within the mobile device. This may make the mobile device owner hesitate or refuse to share the mobile device with other users to show these other users specific content for fear that these other users may utilize the mobile device to access other content that the owner does not want to make public. Many mobile devices may include a lock screen, which may prevent unauthorized users from accessing the contents stored within the mobile device. However, this lock screen may prevent the mobile device owner from allowing other users to access specific content as the other users may require a passcode or other credential to unlock the mobile device, which may expose confidential content to these other users.

BRIEF DESCRIPTION OF THE DRAWINGS

Various embodiments in accordance with the present disclosure will be described with reference to the drawings, in which.

DETAILED DESCRIPTION

Figure 1:
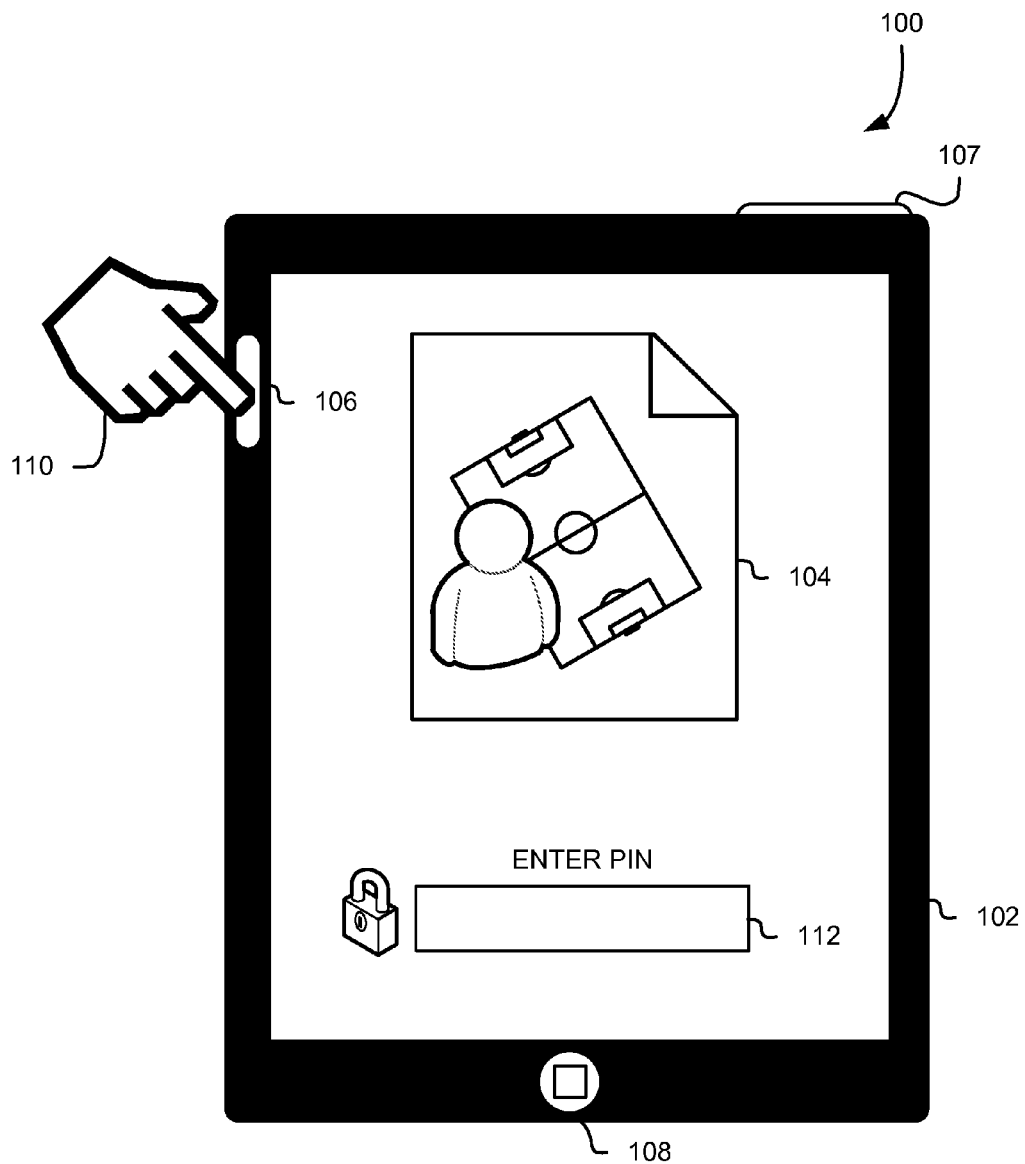
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to an interaction lock mode for disabling interactions on mobile devices. In an embodiment, a user (e.g., an individual) may allow other users and groups to utilize his/her mobile device for a variety of purposes. For instance, the user may allow another user to utilize his/her device to share an image or document that may be displayed on the mobile device. The user may be an owner of a mobile device who utilizes the mobile device to persistently store data (e.g., images, documents, applications and other files) for his/her own needs. For instance, the user may utilize the mobile device to store images of his/her family, financial documents, music collections and the like. Thus, the mobile device may include data that the user may not want to be disseminated to any other users that may utilize his/her device. Accordingly, when the user allows another user to utilize his/her device to share data with this other user, the user may engage a lock button to prevent the other user from accessing any other applications or data on the mobile device while enabling the other user to view the shared data. The lock button may be a mechanical lock button installed on the mobile device whose physical displacement may complete or break a sub-circuit within the mobile device, thereby causing a pressing of the lock button to be detected. This detection may result in the other applications or data on the mobile device to be inaccessible to these other users.

In an embodiment, when the user engages the lock button, the mobile device, through one or more processors, may transmit one or more executable instructions to a plurality of user interface devices that may disable or restrict any user interface devices that may enable the other user to interact with the display unit in order to access other applications or data. For instance, if the mobile device comprises a touchscreen visual display that may be used to interact with data displayed on the mobile device, the mobile device may transmit executable instructions to the touchscreen visual display to limit or disable these interactions. For example, if the user has engaged the lock button to restrict use by the other users, these other users may be presented with a personal identification number (PIN) input box on the touchscreen visual display. Accordingly, the user or other user may be required to enter a correct PIN into the PIN input box to unlock the touchscreen visual display and access other applications and data that may be persistently stored on the mobile device. While a PIN input box and a corresponding PIN are used extensively throughout the present disclosure for the purpose of illustration, other methods may be implemented which may enable a user or other user to unlock the touchscreen visual display. For instance, instead of a PIN input box, the mobile device may be configured to engage a camera installed on the mobile device to perform a facial recognition scan of the user or other user to determine whether this user or other user is authorized to unlock the touchscreen visual display on the mobile device.

In an embodiment, the user may utilize a firmware interface on the mobile device to configure the effects of engaging the lock button on the mobile device. For instance, when the user first initiates the mobile device, the user may engage a home button on the mobile device which may cause the mobile device to enable the user to utilize a firmware interface. This firmware interface may be configured to enable the user to configure a variety of hardware components on the mobile device, as well as define the restrictions to be imposed on the touchscreen visual display upon engaging the lock button. For instance, the user may utilize the firmware interface to define one or more display regions that are to be disabled in the event that a user or other user engages the lock button.

In an embodiment, once the user has utilized the firmware interface to configure the effects of engaging the lock button on the mobile device, the user may utilize one or more applications within an operating system installed on the mobile device. Accordingly, upon selecting an application, the user may engage the lock button to disable or limit one or more sections of the touchscreen visual display and/or other user interface devices installed on the mobile device. For instance, the user may utilize an application usable for processing credit card transactions that requires a user to provide a signature prior to completing to completing the transaction. Accordingly, the user may engage the lock button to disable portions of the touchscreen display that may comprise transaction information. However, other portions of the touchscreen display may remain enabled to allow a user to provide a signature and acknowledge acceptance of the transaction. If the user were to attempt to utilize any other portion of the touchscreen visual display or any other user interface devices installed on the mobile device, the user may be presented with the PIN input box described above.

In this manner, a user may be able to share data displayed on a mobile device with other users while ensuring that the other users do not have access to sensitive or otherwise private data and/or applications that may be persistently stored on the mobile device. In addition, the techniques described herein facilitate additional technical advantages. For example, because, in some embodiments, the user may utilize a firmware interface to configure the effects of utilizing the lock button installed on the mobile device, such as the sections of the touchscreen visual display that are to be disabled when the lock button is engaged, manipulation of the operating system or of any applications installed on the mobile device may have no effect on the configuration of the lock button, the touchscreen visual display or any other user interface devices that may be installed on the mobile device. This, in turn, may provide added security to the mobile device and the applications and data stored therein.

FIG. 1 illustrates an example of an environment 100 in which various embodiments can be implemented. In the environment 100, a user may utilize a mobile device 102 for a variety of purposes. For instance, the mobile device 102 may comprise a plurality of applications, which the user may utilize to support his/her business and personal needs. These applications may be persistently stored in memory, such as a random-access memory (RAM) chip or a hard drive within the mobile device 102. Further, the mobile device 102 may comprise, within a housing for a variety of components, one or more processors configured to execute a series of instructions stored in the memory, such as the applications and/or an operating system for managing the various applications stored therein. The mobile device 102 may further comprise a display unit usable for providing the user or other users of the mobile device 102 with information and other data with regard to a particular application or operating system currently in use. For instance, as illustrated in FIG. 1, the user may utilize an application on the mobile device 102 to view one or more images 104 that may be persistently stored on the mobile device 102. While the use of a tablet computer, as illustrated in FIG. 1, is used for the purpose of illustration, other mobile devices may be used. For instance, the mobile device 102 may be a laptop computer, smartphone device or any other mobile device comprising a plurality of components necessary to implement embodiments of the present disclosure.

The mobile device 102 may comprise one or more user interface devices, which may be used by the user or other user to interact with the mobile device 102 and/or digital content displayed on the mobile device 102. For instance, as illustrated in FIG. 1, the mobile device 102 may comprise a lock button 106 usable for limiting and/or disabling one or more components and user interface devices on the mobile device 102. The lock button may be a mechanical lock button installed on the mobile device whose physical displacement may complete or break a sub-circuit within the mobile device, thereby causing a pressing of the lock button to be detected. For example, when a user utilizes the lock button 106, the display unit, which may be configured to allow users to interact with digital content displayed on the mobile device 102, may no longer allow user to interact with the digital content displayed and/or access other applications or data that may be included on the mobile device 102. The mobile device 102 may be configured to include a firmware interface, which the user may use to configure the effects of using the lock button 106 while interacting with an application or other data persistently stored on the mobile device 106. This may prevent tampering with or modification of the configuration of the lock button 106 and other user interface devices that may be included on the mobile device 102. While a mechanical lock button, such as the lock button 106 illustrated in FIG. 1, is used extensively throughout the present disclosure for the purpose of illustration, other inputs may be used to limit and/or disable one or more components and user interface devices on the mobile device 102. For instance, the mobile device 102 may comprise a microphone usable by a user of the mobile device 102 to provide an auditory command that may cause the mobile device 102 to limit and/or disable one or more components on the mobile device 102. Other examples include, but are not limited to, facial gestures detectable through a camera on the mobile device 102, signals received through one or more ports on the mobile device 102, receipt of a short message service (SMS) message on the mobile device 102 and the like.

Other user interface devices that may be included on the mobile device 102 include a sleep button 107, which may be used to turn the display unit on or off to conserve energy for the mobile device 102 and engage an operating system lock screen; a home button 108, which may be used to exit an application and access the operating system installed on the mobile device 102; the display unit described above; a volume button; a display contrast button and other such buttons.

In an embodiment, the user utilizes the mobile device 102 to select an appropriate image 104 or other digital content, such as a video or music file, that he/she wishes to share with another user 110. This other user 110 may not be authorized to access other applications or data that may be persistently stored on the mobile device 102. Thus, the user may desire to prevent this other user 110 from accessing these other applications and data. Accordingly, the user may engage a lock button 106 once he/she has selected an appropriate image 104 that is to be displayed on the mobile device 102. In the case of a video or music file, the display unit installed on the mobile device 102 may be configured to continue displaying the video or music file (e.g., waveform or visualization elements) while preventing any other interactions from users of the mobile device 102.

When the other user 110 attempts to interact with the display unit or any other user interface device installed on the mobile device 102 that has either been disabled or limited by the user through engagement of the lock button 106, the mobile device 102 may be configured to display a PIN input box 112, which, when a correct PIN is entered, may cause the mobile device 102 to enable interaction with the display unit and any other user interface device. The PIN input box 112 may be a separate application that is incorporated into the firmware interface. Thus, the PIN input box 112 may not be tampered with or modified through manipulation of the operating system or any other applications installed therein.

Figure 2:
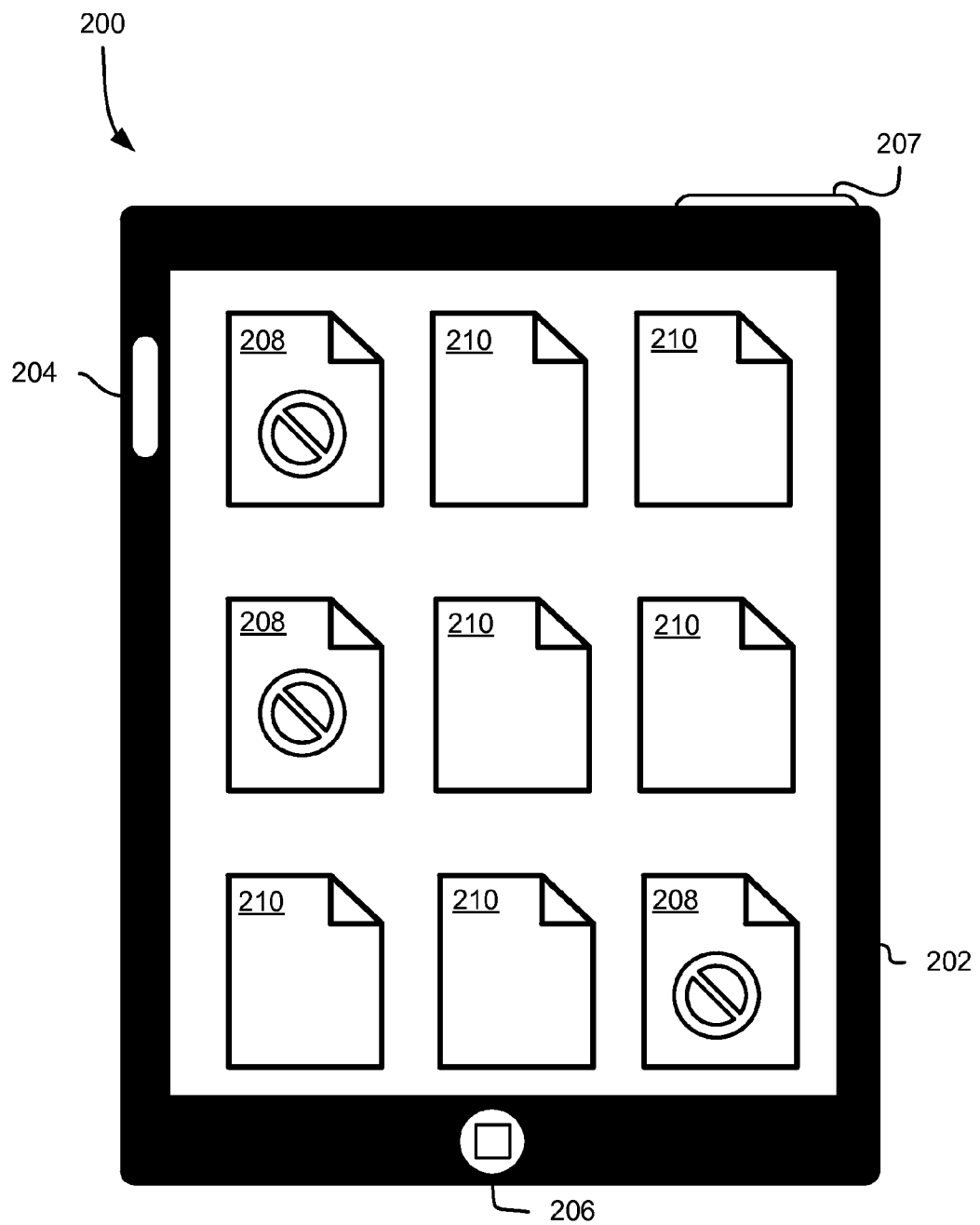
FIG. 2 shows an illustrative example of a mobile device comprising a plurality of components for interacting with data stored within the mobile device according to at least one embodiment.

As noted above, an owner of a mobile device may utilize his/her mobile device to persistently store a variety of applications and data. Accordingly, some of these applications and data may be considered, by the owner of the mobile device, to be proprietary and thus the owner of the mobile device may not want these particular applications or data to be disclosed or available to other users. Accordingly, FIG. 2 shows an illustrative example of an environment 200 that includes a mobile device 202 comprising a plurality of components for interacting with data stored within the mobile device 202 according to at least one embodiment. As noted above, the mobile device 202 may comprise a plurality of hardware components which may be configured to collectively allow a user of the mobile device 202 to, among other things, interact with applications and data that may be persistently stored within the mobile device 202. For instance, these applications and data may be persistently stored in memory, such as a RAM chip or a hard drive within the mobile device 202. The mobile device 202 may additionally comprise, within a housing for a variety of components, one or more processors configured to execute a series of instructions stored in the memory, such as the applications and/or an operating system for managing the various applications stored therein.

In addition to these components, the mobile device 202 may comprise one or more user interface devices which may be used to interact with the mobile device 202. For instance, as illustrated in FIG. 2, the mobile device 202 may include a lock button 204 which may be used to limit or disable interactions that a user may perform with applications and/or data on the mobile device 202. When a user, such as the owner of the mobile device 202, engages the lock button 204, the one or more processors may execute a series of instructions stored in memory that may cause one or more other components of the mobile device 202 to prevent or diminish further interaction with these components. For instance, when the user engages the lock button 204, the one or more processors may execute a series of instructions stored in memory that may cause a display unit to display a PIN input box while preventing any other interactions with other sections of the display unit. Thus, a user or other user may be required to enter a correct PIN into this PIN input box to utilize the entire display unit again. Configuration of the effects resulting from engagement of the lock button 204 may be performed through a firmware interface, which may be accessible independent of any applications or operating systems that may be installed on the mobile device 202. For instance, as will be described in greater detail below in connection with FIG. 4, a user may be able to access the firmware interface when initially powering on the mobile device 202, prior to initialization of the operating system.

Another user interface device that may be installed on the mobile device 202 is a home button 206 which may be used for a variety of purposes. For instance, the home button 206 may be configured to enable a user or other user to access a home screen on the mobile device 202. This home screen may comprise digital pictorial representations (e.g., icons) of one or more applications and data that may be persistently stored on the mobile device 202. For instance, in this illustrative example, the home button 206 may be used to access the home screen on the mobile device 202, which may comprise one or more icons usable to access a plurality of private applications 208 and a plurality of public applications 210.

The mobile device 202 may additionally include a sleep button 207. When a user of the mobile device 202 engages the sleep button 207, the mobile device 202 may transmit one or more signals to display unit that, when processed by the display unit, may cause the display unit to turn on or off, depending on the current state of the display unit. Additionally, engagement of the sleep button 207 may cause the operating system installed on the mobile device 202 to initiate a lock application, which may be configured to prevent users from accessing the applications installed on the mobile device 202 but still utilize the other user interface devices that may be installed on the mobile device 202. While the use of a lock button 204, a home button 206 and a sleep button 207 are used throughout the present disclosure for the purpose of illustration, the mobile device 202 may include other user interface devices which may be used to customize the interaction with the mobile device 202. For instance, as noted above, the mobile device 202 may include a volume button usable to determine a volume level for audio output from the mobile device 202, a button for turning the mobile device 202 on or off and the like.

Since the home screen on the mobile device 202 may enable a user to access private applications 208 as well as public applications 210, the lock button 204, when engaged by a user, may cause the mobile device 202 to transmit executable instructions to the display unit that, when executed by the display unit, may cause the display unit to prevent any users from accessing the private applications 208 presented on the home screen. Alternatively, the executable instructions may cause the display unit to hide the private applications 208 from the home screen in order to prevent other users from viewing any proprietary information that may be persistently stored on the mobile device 202. If the owner of the mobile device 202 has accessed an application for display on the mobile device 202 and this application is visible on the display unit, engagement of the lock button 204 may further cause the mobile device 202 to disable or limit the functionality of the home button 206 and/or the sleep button 207. For instance, if a user engages the home button 206 after the lock button 204 has been engaged, the display unit may not display the home screen comprising iconic representations of the myriad applications and data persistently stored on the device.

Figure 3:
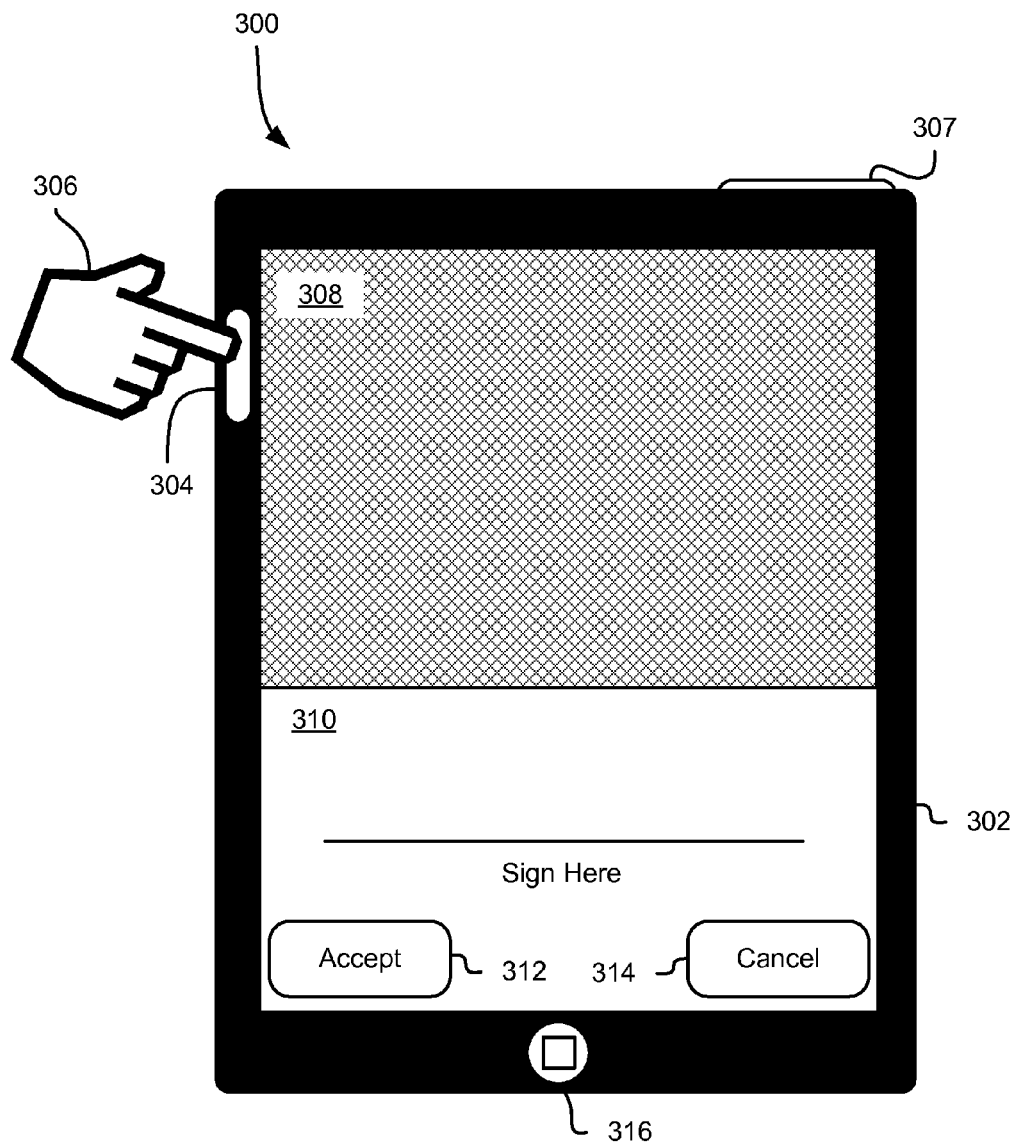
FIG. 3 shows an illustrative example of a mobile device comprising a display unit that has been partially disabled as a result of engagement of a lock button in accordance with at least one embodiment.

As noted above, a user, such as an owner of a mobile device or another user, may configure the lock button installed on the mobile device to limit or disable functionality features of a display unit when the lock button is engaged. The user may, through a firmware interface, define which regions of the display unit may be affected by engagement of the lock button. Accordingly, FIG. 3 shows an illustrative example of a mobile device 302 comprising a display unit that has been partially disabled as a result of engagement of a lock button 304 in accordance with at least one embodiment. When a user 306, such as an owner of the mobile device 302 or another user of the mobile device 302, engages the lock button 304 on the mobile device 302, the mobile device 302 may transmit one or more executable instructions to one or more components which may cause reduced functionality or disabling of these one or more components. For instance, as illustrated in FIG. 3, when the user 306 engages the lock button 304 on the mobile device 302, a portion of the display unit may be locked, such that a user may not interact with content displayed on this locked display section 308. Alternatively, when the user 306 engages the lock button 304, the locked display section 308 may be completely disabled such that the locked display section 308 does not display any content. Thus, any processes that would normally cause content to be displayed on the locked display section 308 may no longer be displayed until the mobile device 302 has been unlocked. As an alternative, the locked display section 308 may contain content, such as images (which may be animated), video, text and/or other content. Such content may be user-configurable to enable users to customize what appears in the locked display section 308.

However, other portions of the display unit may still be accessible and thus may be utilized by a user for a variety of purposes. For example, as illustrated in FIG. 3, the user may utilize an application that may require a user to provide a signature or other adequate input. Thus, the user may configure the lock button 304, through a firmware interface, to only disable a particular portion of the display while allowing a user to interact with an unlocked display section 310. The user may utilize the lock button 304 while utilizing the particular application to prevent the user from utilizing this unlocked display section 310 to access other applications and/or data persistently stored on the mobile device 302.

Thus, if the user has configured the lock button 304 such that an unlocked display section 310 is accessible to other users, the other users may utilize this portion of the display to interact with an application or data made available to these other users by the user. In this particular example, other users may utilize the unlocked display section 310 to provide a signature, select a displayed accept button 312 to approve the use of this signature or select a displayed cancel button 314 to reject the provided signature. Once the user has completed using the mobile device 302, he/she may return the mobile device 302 to the user. If the user attempts to interact with the locked display section 308 or bypass the application by using the sleep button 307 and/or the home button 316 to access a home screen comprising iconic representations of applications and/or data persistently stored on the mobile device 302, the mobile device 302 may transmit one or more executable instructions to the display unit that, when executed by the display unit, may cause the display unit to display a PIN entry box, which may enable a user or other user to enter a PIN to unlock all portions of the display unit, as well as any other user interface devices, such as the sleep button 307 and the home button 316, that may have been disabled or subject to reduced functionality. Alternatively, attempted interaction with the sleep button 307, the home button 316 or the locked display section 308 may result in no effect, since functionality for the sleep button 307, the home button 316 and the locked display section 308 may be disabled.

Figure 4:
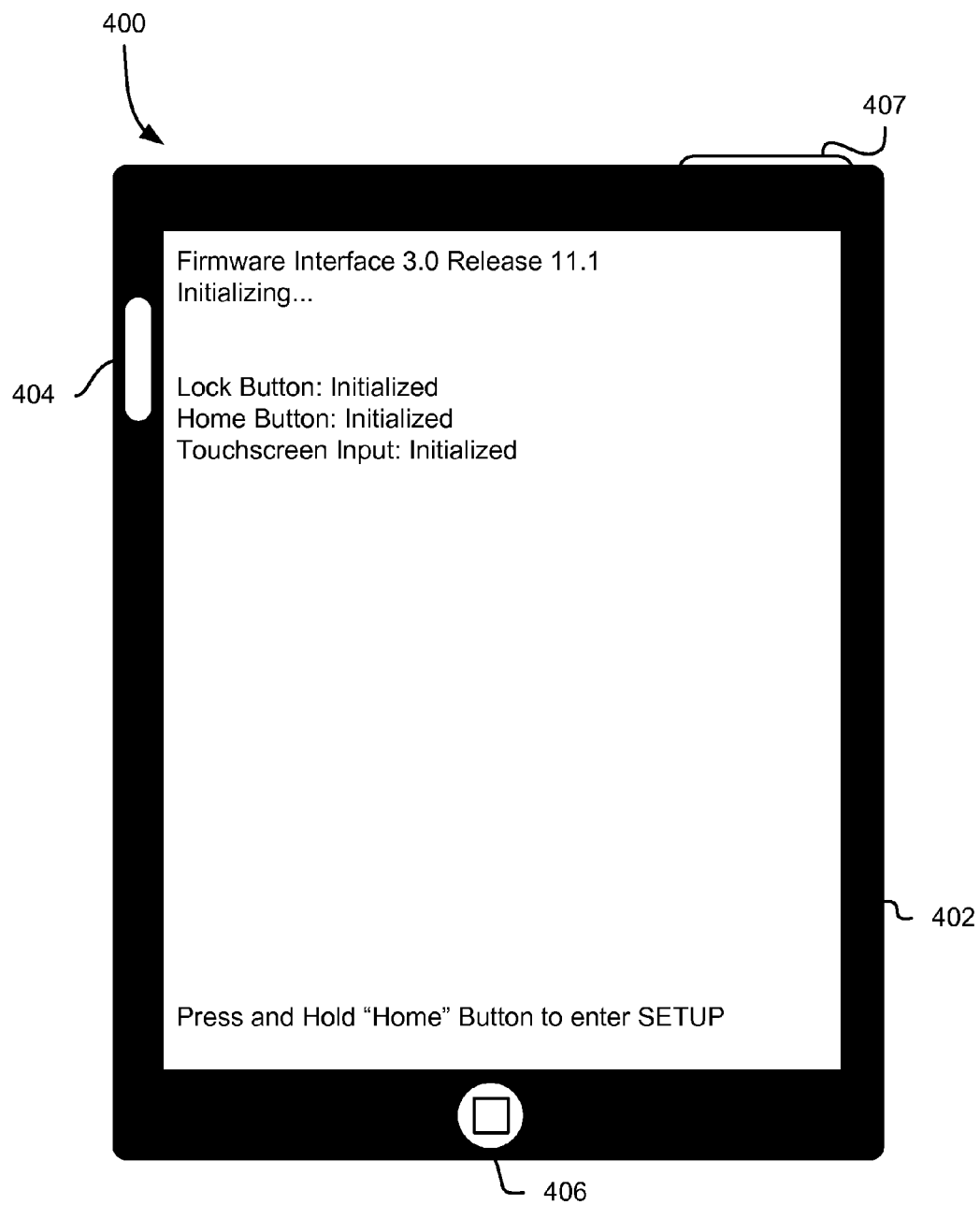
FIG. 4 shows an illustrative example of a mobile device wherein the lock button is initialized through a firmware interface in accordance with at least one embodiment.

As noted above, a user, such as the owner of a mobile device or other user authorized to manage functionality of the mobile device, may configure a lock button installed on the mobile device to disable or reduce functionality of one or more components of the mobile device when the lock button is engaged. In an embodiment, the mobile device comprises a firmware interface which may be used to configure one or more hardware components installed on the mobile device. Accordingly, FIG. 4 shows an illustrative example of a mobile device 402 wherein the lock button 404 is initialized through a firmware interface in accordance with at least one embodiment. The firmware interface may be made available through the mobile device 402 when the mobile device 402 is initially powered on. Thus, the firmware interface may operate independently from the operating system or any other application that may be configured to operate within the operating system environment. This may prevent unauthorized users from tampering with or modifying the lock button 404 functionality from within the operating system environment or from within an application usable within this operating system environment.

As illustrated in FIG. 4, the firmware interface may be configured to initialize and test one or more hardware components installed on the mobile device 402. For instance, as illustrated in FIG. 4, the firmware interface may be configured to initialize the lock button 404, the home button 406, the sleep button 407 and enable a user to utilize the display unit to provide input (e.g., "touchscreen input," as illustrated in FIG. 4). Once these one or more hardware components have been initialized and tested to ensure that these hardware components are fully functional, the firmware interface may enable a user to utilize a user interface device, such as the lock button 404, a home button 406 or a sleep button 407 to configure and customize functionality of these user interface devices or other hardware components within the mobile device 402. For instance, as illustrated in FIG. 4, the firmware interface may be configured to transmit one or more executable instructions to a display unit on the mobile device 402 that, when executed by the display unit, may cause the display unit to display that the user may press and hold down the home button 406 in order to configure the one or more hardware components within the mobile device 402.

If the user does not utilize a user interface device to configure and customize functionality of these user interface devices or other hardware components within the mobile device 402, the firmware interface may proceed to load an operating system persistently stored within the mobile device 402 to enable the user or other user to access one or more applications and/or data persistently stored within the mobile device 402. Accordingly, once the firmware interface has loaded the operating system, the user may be unable to further configure and customize functionality of the user interface devices or other hardware components within the mobile device 402 until the user restarts the mobile device 402.

However, if the user does opt to utilize a user interface device to configure and customize functionality of the user interface devices or other hardware components within the mobile device 402, the firmware interface may initiate a firmware interface application (such as "SETUP," as illustrated in FIG. 4) which may include one or more options for enabling or limiting functionality of one or more hardware components installed on the mobile device 402. For instance, a user may utilize this firmware interface application to, among other things, determine the boot sequence for the various hardware components installed on the mobile device 402, determine which hardware components are to be initialized when turning on the mobile device 402, disable one or more hardware components on the mobile device 402 to perform diagnostic analyses on these one or more hardware components or remove them altogether from the mobile device 402, configure the effect of utilizing a user interface device and the like.

Once the user has completed using the firmware interface application to determine the functionality of the various hardware components installed on the mobile device 402, include the one or more user interface devices, the firmware interface may transmit executable instructions to these various hardware components that may cause these various hardware components to operate in conformity with the user's requests. The firmware interface may also cause the mobile device 402 to reboot, thereby enabling the firmware interface to again initialize the various hardware components according to the user's configuration of these components through the firmware interface application.

It should be noted that the firmware interface illustrated in FIG. 4 is an illustrative example of a firmware interface that may be installed on a mobile device 402. Accordingly, the mobile device 402 may be configured to include one or more different versions of a firmware interface, which may be selected based on manufacturer preferences or requirements. Examples of firmware interfaces may include the Basic Input/Output System (BIOS), Advanced Configuration and Power Interface (ACPI), Unified Extensible Firmware Interface (UEFI) and others.

Figure 5:
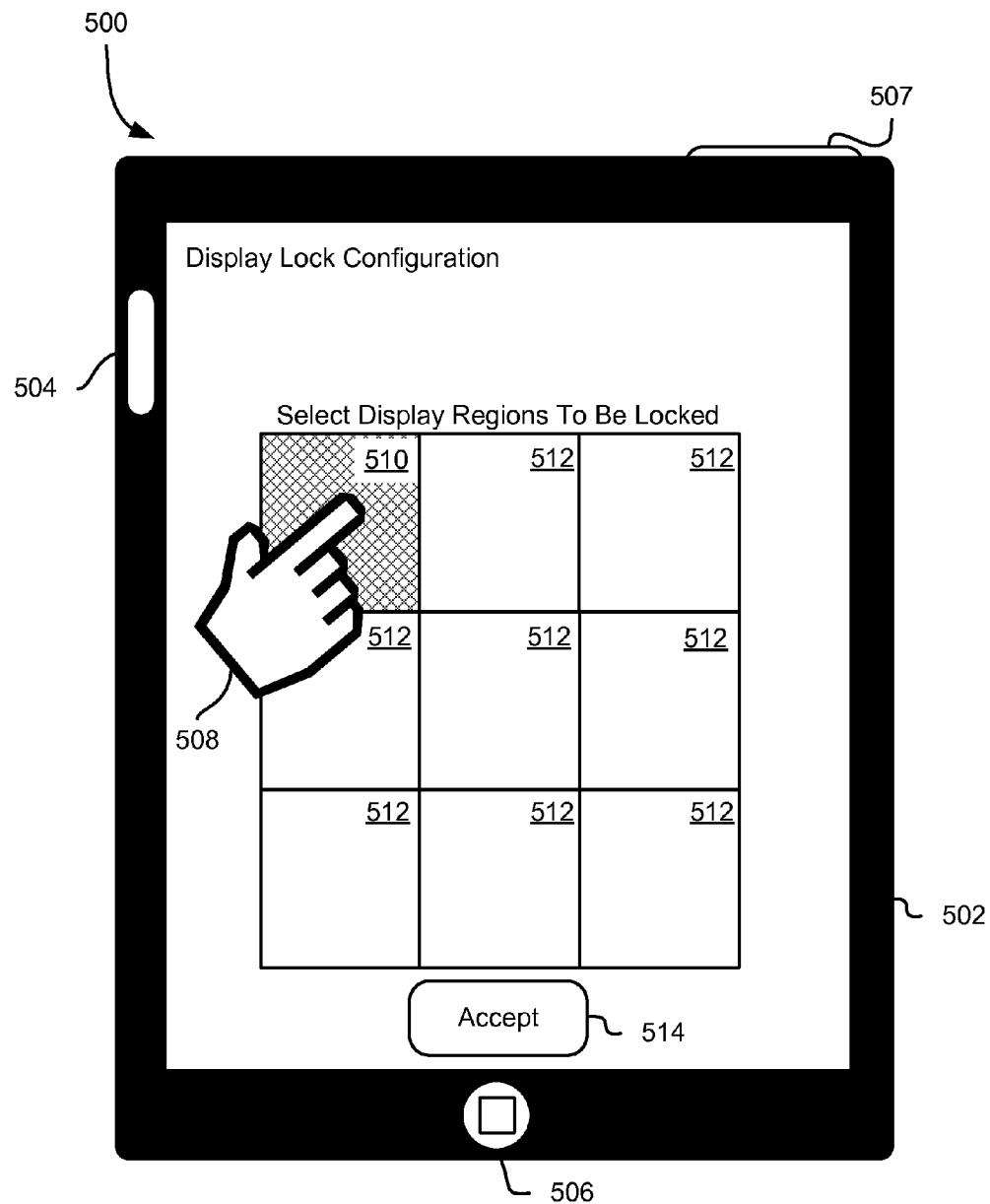
FIG. 5 shows an illustrative example of an application accessible through the firmware interface for selecting display regions to be locked when the lock button is engaged in accordance with at least one embodiment.

As noted above, a user, such as an owner of the mobile device or other user that may be permitted to manage and operate the mobile device, may utilize a firmware interface installed on the mobile device to configure one or more hardware components installed on the mobile device. For instance, in an embodiment, a user can utilize a firmware interface installed on the firmware device to select one or more display unit sections that are to be disabled when the user engages the lock button installed on the mobile device. Accordingly, FIG. 5 shows an illustrative example of an application accessible through the firmware interface installed on a mobile device 502 for selecting one or more display regions to be locked when the lock button 504 is engaged in accordance with at least one embodiment. As noted above in connection with FIG. 3, a user 508 may allow another user to utilize a portion of a display unit on the mobile device 502 to provide a signature and otherwise interact with a particular application. However, the other user may not be permitted to utilize any other portion of the display unit, as the user 508 may want to prevent the other user from accessing other applications and data that may be persistently stored on the mobile device 502.

Accordingly, the user 508 may, upon initially turning on the mobile device 502, access the firmware interface to modify the configuration of the display unit such that engagement of the lock button 504 may cause certain sections of the display unit to operate with limited functionality. For instance, these sections of the display unit may enable the other user to view an application or data of the user's 508 choosing. However, the other user may not be able to interact with the application or data displayed in these sections. If the other user attempts to interact with these sections, the mobile device 502 may be configured to transmit executable instructions to the display unit that, when executed by the display unit, may cause the display unit to display a PIN input box. The PIN input box may be usable by an user 508 to unlock these particular sections of the display unit that have been disabled based at least in part on the configuration of the display unit through the firmware interface.

As illustrated in FIG. 5, when a user 508 utilizes the firmware interface to access a display unit configuration application, the user 508 may be presented with a representation of the display unit, which may be divided into a plurality of sections. Accordingly, the user 508 may select one or more sections from this representation to indicate that these particular sections should be disabled when the user 508 engages the lock button 504 installed on the mobile device 502. For instance, as illustrated in FIG. 5, the user 508 has selected an upper section of the display unit that is to be disabled upon engagement of the lock button 504. Accordingly, upon selection of this section, the selected section 510 may be highlighted or shaded to indicate that this particular section is to be disabled upon engagement of the lock button 504. Thus, the user 508 may be able to distinguish between selected sections 510 and unselected sections 512 such that the user 508 may have an understanding of the potential effect of utilizing the lock button 504. While the use of highlighting or shading is used throughout the present disclosure for the purpose of illustration, other methods for displaying selected sections 510 of the display unit may be utilized. For instance, upon selection of a particular section of the display unit, the selected section 510 may include text, such as "DISABLED," that may inform the user that this selected section 510 will be disabled upon accepting the configuration of the display unit in response to engagement of the lock button 504.

Once the user 508 has selected the appropriate sections of the display unit that are to be disabled if the user engages the lock button 504, the user 508 may accept these selections by utilizing an accept button 514 provided by the application. Accordingly, the application may generate one or more executable instructions that may be stored in memory within the mobile device 502, which may be accessed by the mobile device 502 when the user engages the lock button 504. Additionally, the application may be terminated, at which time the firmware interface may restart the mobile device 502 and load the operating system to enable the user 508 to access the applications and data that may be persistently stored therein, as well as engage the lock button 504 to allow other users to view an application or data of the user's 508 choosing without the ability to access any other applications or data that may be persistently stored on the mobile device 502.

While the application illustrated in FIG. 5 may be utilized to select one or more sections of a display unit that may be disabled upon engagement of a lock button 504, the application may comprise additional components and options that may enable a user 508 to further define the effect of engaging the lock button 504 on other mobile device 502 components. For instance, the application within the firmware interface may enable a user 508 to define limitations on the use of a home button 506 or a sleep button 507 installed on the mobile device 502 when the lock button 504 has been engaged. For example, the user 508 may utilize the application to specify that when another user utilizes the home button 506 and/or the sleep button 507 once the lock button 504 has been engaged, a PIN input box may be displayed. Further, the user 508 may specify that use of the home button 506 may not cause the mobile device 502 to display a home screen, which may comprise iconic representations of other applications and data that may be persistently stored on the mobile device 502.

Figure 6:
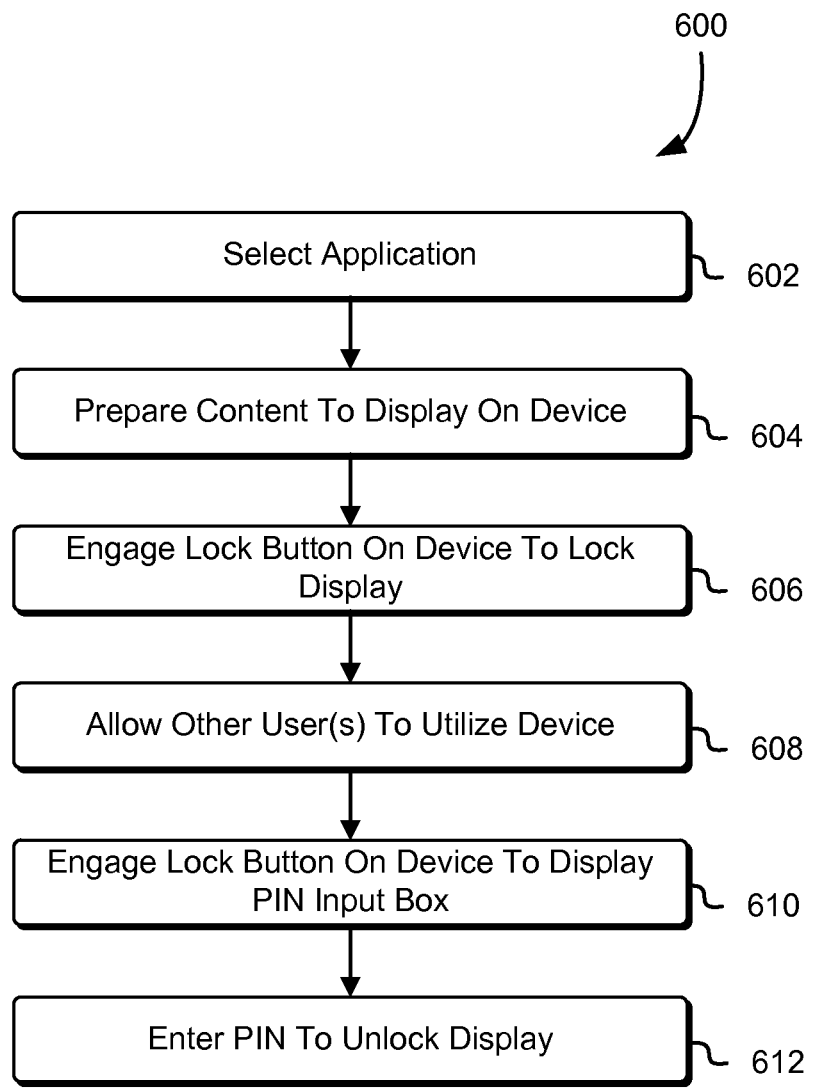
FIG. 6 shows an illustrative example of a process for sharing selected data with other users while disabling the display on a mobile device in accordance with at least one embodiment.

As noted above, a user, such as an owner of a mobile device, may want to share an image, document or other data with another user while preventing this other user from accessing proprietary or otherwise private data that may be persistently stored on the mobile device. Accordingly, FIG. 6 shows an illustrative example of a process 600 for sharing selected data with other users while disabling the display on a mobile device in accordance with at least one embodiment. The process 600 may be performed by an owner or other authorized user of a mobile device that may want to share data with other users while preventing these other users from accessing other private data that may be persistently stored on the mobile device.

An owner of a mobile device or any other authorized user of a mobile device may utilize the mobile device to persistently store one or more applications on the mobile device. Additionally, the owner or other authorized user of the mobile device may use the mobile device to store other types of data, such as image files, documents (e.g., presentation materials, memoranda, etc.), music files, database files and the like. Some of these applications and data may be considered proprietary or otherwise private by the owner or other authorized user of the mobile device. Accordingly, these applications and data may not be made available to other users that may be granted access to the mobile device. However, there may be instances where the owner or other authorized user of the mobile device may want to share certain data or applications with other users. Accordingly, in such instances, the owner or other authorized user may select 602 an application that is to be used to share data with other users. The application may comprise one or more modules of executable code and/or resource files (e.g., images, sounds, videos, etc.). For instance, this application may be an image viewing application for accessing and viewing one or more images that may be persistently stored on the mobile device. Alternatively, the application may be a word processing program through which a user may access and manipulate one or more documents.

Once the owner of the mobile device or other authorized user has selected an appropriate application that may be used to access the data, the owner of the mobile device or other authorized user may prepare 604 the data content that is to be displayed on the mobile device. For instance, if the owner of the mobile device or other authorized user has selected an image viewing application, he/she may utilize the application to select one or more images persistently stored on the mobile device that may be displayed. The data that is to be displayed on the mobile device will not comprise proprietary or otherwise private data that the owner of the mobile device or other authorized user does not want to share with other users. Additionally, the preparation of the data content to be displayed may cause other data or applications to not be visible through the display unless further actions are taken by the owner of the mobile device or other authorized user to make these other applications or other data available. For instance, as illustrated in FIGS. 1-5, the mobile device may comprise a home button which, when engaged, may cause the mobile device to close the current application and display a home screen. This home screen may comprise iconic representations of other applications and data that may be persistently stored on the mobile device.

If the owner of the mobile device or other authorized user has selected appropriate content that may be shared with other users, he/she may engage 606 a lock button installed on the mobile device to cause the display to be locked. For instance, as noted above, when the owner of a mobile device engages the lock button installed on the mobile device, the mobile device may transmit executable instructions to the display unit of the mobile device that, when executed by this display unit, may cause the display unit to restrict any interactions through use of the display unit. For instance, in various embodiments, the display unit is a touchscreen visual display element, which may be configured to receive user input when the user of the mobile device uses his/her fingers to interact with the display unit. Accordingly, the user's tactile interaction with the display unit may be converted into programmatic input that may be used by an application or operating system installed on the mobile device to perform one or more actions. For instance, a user may provide tactile interaction with a displayed menu on the mobile device to select an item from this menu.

Accordingly, when the owner of the device engages the lock button on the mobile device to lock the display unit, other users may be unable to interact with the displayed application or data on the mobile device. Additionally, engagement of the lock button on the mobile device may cause the display unit to display a PIN input box if the other user attempts to interact with the displayed content. Thus, the other user may be required to enter a correct PIN into the PIN input box to be able to interact with the displayed content and/or access other applications and data that may be persistently stored on the mobile device. While the use of a display unit is used extensively throughout the present disclosure for the purpose of illustration, other user interface devices may be locked (e.g., disabled or have reduced functionality) when the owner of the device or other authorized user engages the lock button. For instance, when the owner of the mobile device or other authorized user engages the lock button, the mobile device may reduce the functionality of the home button installed on the mobile device. Thus, when another user engages this home button after the lock button has been engaged, the mobile device may display a PIN input box on the display instead of presenting the other user with a home screen usable to view iconic representations of other applications and data that may be persistently stored on the mobile device.

Once the owner of the mobile device or other authorized user has engaged the lock button on the mobile device to lock the display unit and he/she is satisfied with the content displayed, the owner of the mobile device or other authorized user may allow 608 other users to utilize the mobile device. For instance, the owner of the mobile device or other authorized user may allow other users to utilize the mobile device to share one or more images with the other users. For example, an owner of the mobile device may give the mobile device to a friend or colleague to show him/her an image of the owner's child or spouse. Alternatively, the mobile device may be provided to others users in a collaborative environment, such as a conference or other meeting where documents and other information may need to be shared with others present. Thus, physical control of the mobile device may need to be relinquished temporarily in order to allow other users to view the content displayed on the mobile device.

After the other users have finished utilizing the mobile device, the owner of the mobile device or other authorized user may again engage 610 the lock button installed on the mobile device to cause the mobile device to display a PIN input box. As noted above, this PIN input box may be used to provide a PIN that, if it matches an expected PIN value stored within memory, may cause the display unit to be unlocked and fully functional. It should be noted that other user interface devices may be also be used to cause the mobile device to display the PIN input box. As noted above, when a user of the mobile device attempts to interact with the display unit after the lock button has been initially engaged, the mobile device may transmit executable instructions to the display unit that, when executed by the display unit, may cause the display unit to display the PIN input box. Further, while the use of a PIN input box is used throughout the present disclosure for the purpose of illustration, other security methods may be presented that may be used to unlock the display unit on the mobile device. For instance, engagement of the lock button on the mobile device may cause a camera installed on the mobile device to capture an image of the current user, which may be used to determine whether this current user is authorized to fully utilize the mobile device.

Once the owner of the mobile device or other authorized user has been presented with a PIN input box on the display unit of the mobile device, the owner of the mobile device or other authorized user may enter 612 a PIN into the PIN input box in order to unlock the display unit, as well as any other user interface devices that may have been locked as a result of engagement of the lock button. As noted above, the owner of the mobile device or other authorized user may engage the lock button or other user interface device to cause the display unit to display a PIN input box. In addition to displaying the PIN input box, the display unit may be configured to display a graphical representation of a keyboard, which the owner of the device or other user may interact with in order to enter the PIN into the PIN input box. This level of interaction may be limited, such that the graphical representation of the keyboard may only be used for entering a PIN into the PIN input box and for no other purpose.

Thus, when the owner or other user enters a PIN into the PIN input box, the mobile device may compare the entered PIN to an expected value for the PIN. If the entered PIN matches the expected value for the PIN, the mobile device may transmit one or more executable instructions to the display unit and any other user interface devices that may have been locked that may cause the display unit and these other user interface devices to operate with full functionality. Thus, the owner of the device or other authorized user may be able to utilize the mobile device to access all applications and data that may be persistently stored on the mobile device. However, if the owner of the device or other authorized user does not enter a correct PIN into the PIN input box, the display unit and other user interface devices may remain locked, ensuring that access to the other applications and data persistently stored on the mobile device remains restricted.

Figure 7:
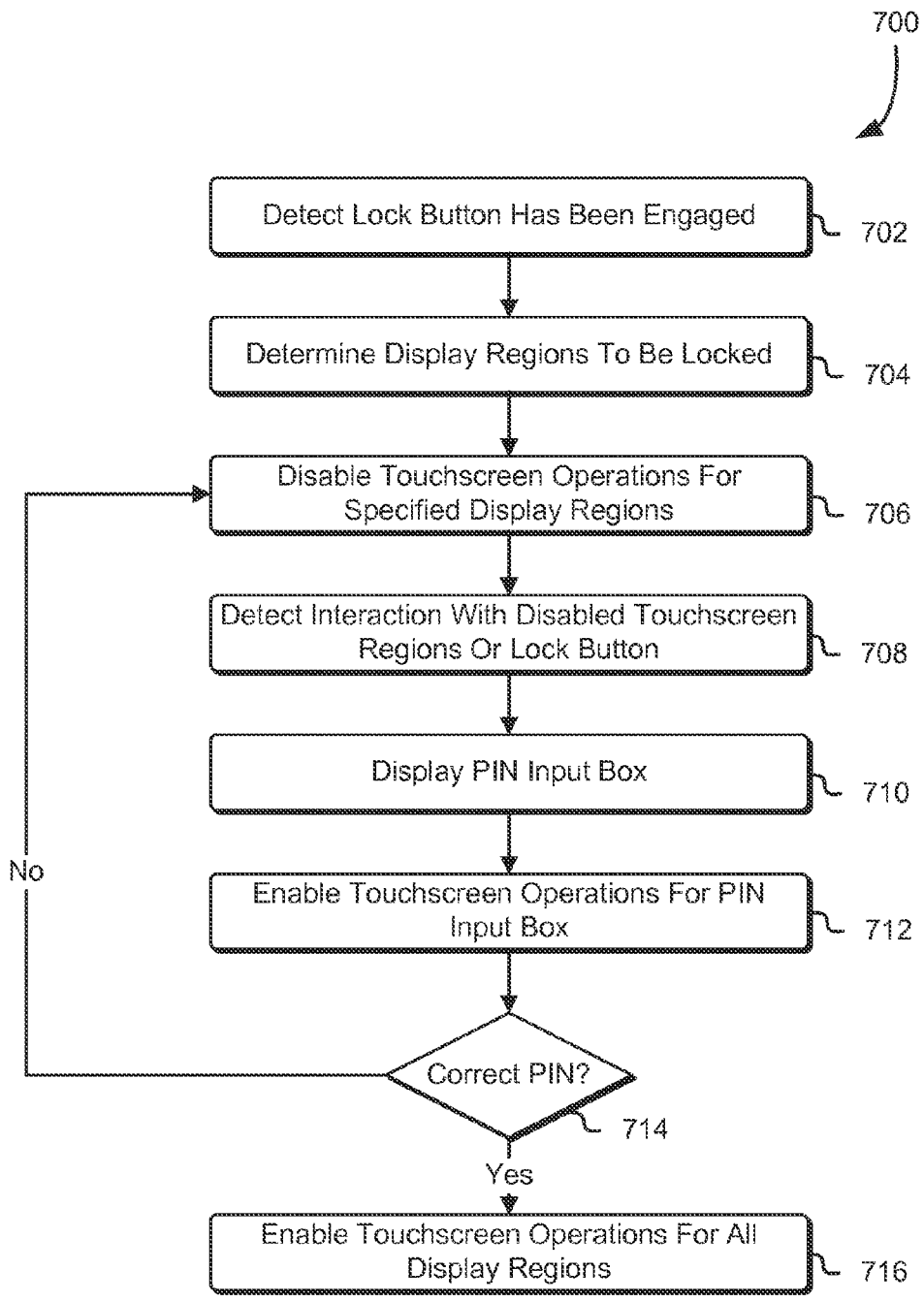
FIG. 7 shows an illustrative example of a process for disabling display regions and other functions upon detection of engagement of a lock button in accordance with at least one embodiment.

As noted above, when an owner of a mobile device or other authorized user engages a lock button installed on the mobile device, the mobile device may transmit one or more executable instructions to a display unit and other user interface devices installed on the mobile device that may reduce the functionality or disable the display unit and these other user interface devices. Accordingly, FIG. 7 shows an illustrative example of a process 700 for disabling display regions and other functions upon detection of engagement of a lock button in accordance with at least one embodiment. The process 700 may be performed by a mobile device comprising one or more user interface devices and a display unit for viewing applications and data that may be persistently stored on the mobile device. Additionally, the mobile device may include one or more executable instructions, stored in memory, which may be executed by the mobile device once the lock button has been engaged.

An owner of a mobile device or other authorized user may utilize a mobile device to share an application or other data that may be persistently stored on the mobile device with other users. Accordingly, the owner of the mobile device or other authorized user may select an application or other data that may be shared with these other users and engage a lock button installed on the mobile device to prevent these other users from accessing other applications or data that may be persistently stored on the mobile device. When the owner of the mobile device or other authorized user engages the lock button installed on the mobile device, a hardware interrupt may be transmitted to one or more processors within the mobile device. This hardware interrupt may cause the one or more processors to register the signal from the engaged lock button and, as will be described in greater detail below, transmit executable instructions to the display unit or any other user interface devices. Thus, the mobile device may initially detect 702 that the lock button has been engaged.

Accordingly, the mobile device may retrieve one or more executable instructions that may be stored in memory in order to determine 704 which display regions on the display unit are to be locked as a result of engagement of the lock button. Additionally, the mobile device may utilize these one or more executable instructions to further identify any other user interface devices that are to be disabled or configured to perform with limited functionality. For instance, as described above in connection with FIG. 5, an owner of the mobile device or other authorized user may utilize an application within a firmware interface installed on the mobile device to define one or more display regions that are to be locked in the event that the lock button is engaged. Alternatively, the mobile device may be configured to disable all display regions in the event that the lock button is engaged without input from the owner of the mobile device or other authorized user through the firmware interface. The owner of the mobile device or other authorized user may utilize an application within the firmware interface to specify the effect engagement of the lock button may have on other user interface devices, such as the home button illustrated in FIGS. 1-5. For instance, if the owner of the mobile device or other authorized user engages the lock button, the mobile device may cause the home button to become disabled. Thus, engagement of the home button may not cause the mobile device to display a home screen that may comprise iconic representations of the applications or data that may be persistently stored on the mobile device. In an embodiment, engagement of the lock button also causes the mobile device to further prevent auto-rotation of the elements displayed on the display unit if a user of the mobile device rotates the mobile device. For instance, if an owner of the mobile device or other authorized user engages the lock button, the one or more processors operating within the mobile device may cause an accelerometer, usable to detect physical movement of the mobile device, to be disabled. Thus, if a user of the mobile device rotates the mobile device, the accelerometer may not detect this physical movement and, as a result, the elements displayed on the display unit may not be rotated.

Based at least in part on the display regions the owner of the device or other authorized user has specified should be locked upon engagement of the lock button installed on the mobile device, the mobile device, through one or more processors configured to execute one or more sets of instructions stored in memory, may transmit one or more executable instructions to the display unit installed on the mobile device to cause the display unit to disable 706 touchscreen operations for these specified display regions. For instance, as illustrated in FIG. 3, an owner of the mobile device or other authorized user may utilize an application installed on the mobile device that may require user input. For example, if the mobile device is used for credit card transactions, the application displayed may be used to present a user with a detailed description of the transaction, as well as a section which may be used by the user to supply a signature for acknowledgment of the transaction. Thus, one or more regions of the touchscreen display may need to be fully enabled to allow the user to provide a signature on the mobile device. The owner of the device or other authorized user may select an application and associated display regions that, while usable by another user, may not enable the other user to access other applications and data that may be persistently stored on the mobile device. Thus, the engagement of the lock button results in a disabling of the touchscreen operations regardless of which application and/or operating system is currently in use on the mobile device.

Once the lock button has been engaged and the mobile device has been provided to the other user, the mobile device may continue to display the content selected by the owner of the device or other authorized user until it detects 708 attempted interaction with the disabled display regions, the lock button or any other user interface device installed on the mobile device disabled or limited as a result of engagement of the lock button. For instance, the display unit installed on the mobile device may typically be used by a plurality of users to interact with content displayed on the mobile device through the use of tactile feedback. For example, a user may tap on a graphical representation of an application on a selected portion of the display unit to cause the mobile device to activate the application. In another instance, a user may again engage the lock button installed on the mobile device to attempt to unlock the display unit and any other user interface devices. For example, if the mobile device is configured to power off the display unit after a certain period of time in order to preserve battery power, engagement of the lock button installed on the mobile device may cause the display unit to be powered on. However, the display unit may remain unusable for input for these disabled display regions.

If a user interacts with a disabled display region, the lock button or other user interface device installed on the mobile device, the mobile device may transmit executable instructions to the display unit that may cause the display unit to display 710 a PIN input box. As noted above, the PIN input box may be utilized by a user of the mobile device to provide a PIN. The PIN may be a set of alphanumeric characters that are known to the owner of the mobile device or other authorized user. Thus, any other user of the mobile device may not know what PIN is to be provided in order to unlock the various user interface devices installed on the mobile device.

In order for a user to be able to input a PIN into the PIN input box, the mobile device may transmit one or more executable instructions to the display unit that, when executed by the display unit, may cause the display unit to enable 712 touchscreen operations or other operations related to the PIN input box. For instance, the mobile device may cause the display unit to display a graphical representation of a keyboard, which may be used by a user of the mobile device to enter a PIN into the PIN input box. Accordingly, touchscreen functionality for these display regions may be temporarily enabled, such that a user of the mobile device may enter a PIN into the PIN input box while preventing the user of the mobile device from accessing other applications and data that may be persistently stored within the mobile device.

Once the user of the mobile device has provided a PIN through use of the PIN input box, the mobile device may determine 714 whether the PIN entered into the PIN input box is correct. For instance, when an owner of the mobile device or other authorized user configures the mobile device for the first time, he/she may be required to provide, through a firmware interface, a PIN, which may be used for a variety of purposes, including unlocking the display unit and other user interface devices installed on the mobile device if the lock button is engaged. Thus, the PIN provided during the initial configuration of the mobile device may be stored in memory. Accordingly, the mobile device may be configured to compare the PIN entered through the PIN input box to the PIN stored in memory to determine if there is a match. If the PIN entered through the PIN input box matches the expected value for the PIN, the mobile device may enable 716 touchscreen operations for all display regions, as well as restore functionality for all user interface devices that may have been disabled or limited as a result of a user having engaged the lock button.

However, if the correct PIN is not entered into the PIN input box, the mobile device may transmit executable instructions to the display unit that, when executed by the display unit, may cause the display unit to remove the PIN input box and again disable 706 touchscreen operations for the specified display regions. Thus, a user of the mobile device may be required to again attempt to interact with the mobile device in order to be able to enter a new PIN into the PIN input box and attempt to unlock the various user interface devices installed on the mobile device.

Figure 8:
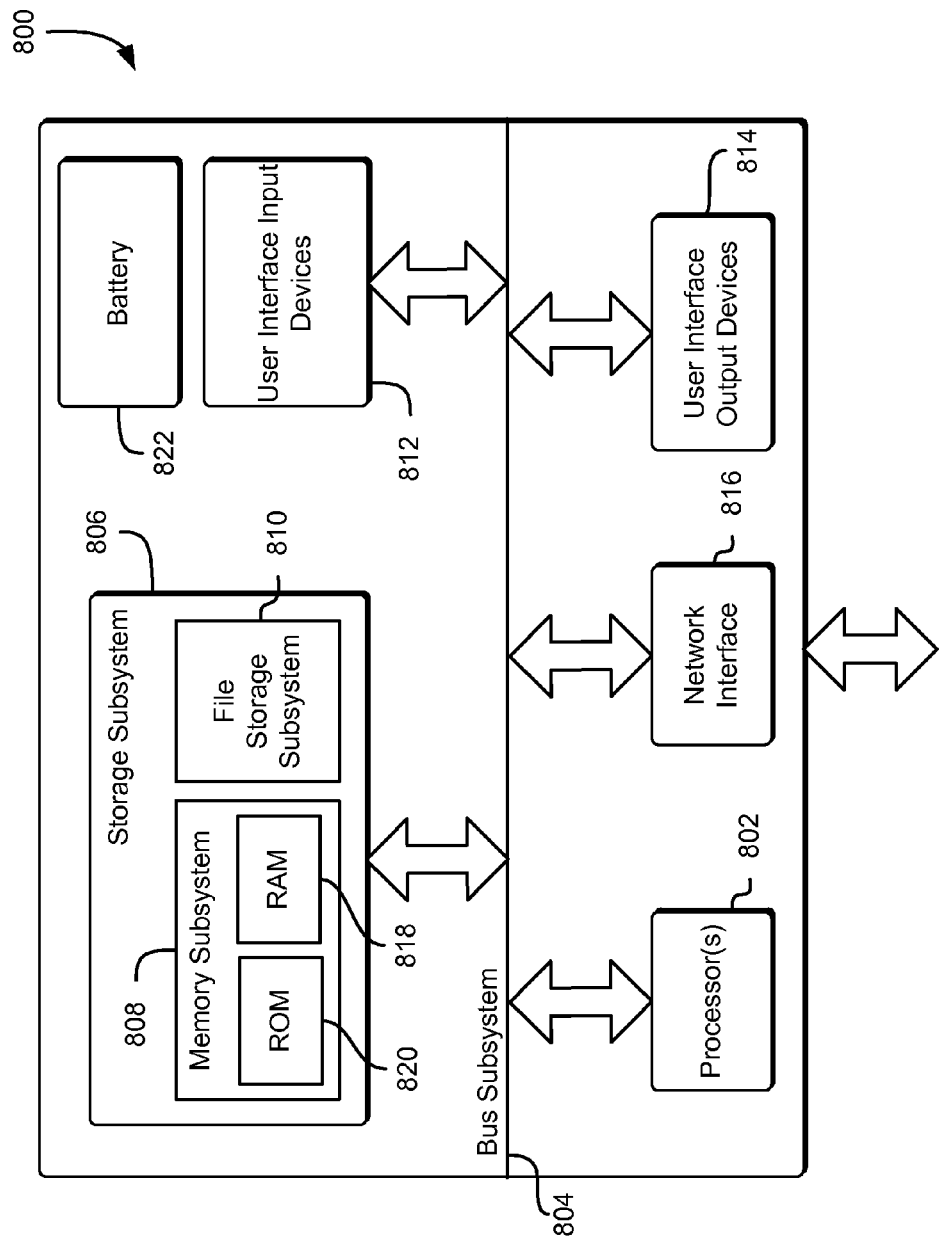
FIG. 8 shows an illustrative example of an example device system that may be used in accordance with various embodiments.

FIG. 8 is an illustrative, simplified block diagram of an example mobile device system 800 that may be used to practice at least one embodiment of the present disclosure. In various embodiments, the mobile device system 800 may be used to implement any of the systems illustrated herein and described above. For example, the mobile device system 800 may be used to interact with a variety of applications and data persistently stored on the mobile device, configure a plurality of user interface devices to operate in accordance with a user's business needs, submit any requests to an outside user, receive any responses or communications from an outside user, display one or more applications or data on a display and/or perform other activities. As shown in FIG. 8, the mobile device system 800 may include one or more processors 802 that may be configured to communicate with and are operatively coupled to a number of peripheral subsystems via a bus subsystem 804. These peripheral subsystems may include a storage subsystem 806, comprising a memory subsystem 808 and a file storage subsystem 810, one or more user interface input devices 812, one or more user interface output devices 814, and a network interface subsystem 816.

The bus subsystem 804 may provide a mechanism for enabling the various components and subsystems of mobile device system 800 to communicate with each other as intended. Although the bus subsystem 804 is shown schematically as a single bus, alternative embodiments of the bus subsystem may utilize multiple busses.

The network interface subsystem 816 may provide an interface to other device systems and networks. The network interface subsystem 816 may serve as an interface for receiving data from and transmitting data to other systems from the mobile device system 800. For example, the network interface subsystem 816 may enable a user of the mobile device to connect the mobile device to a wireless network such that the user of the mobile device may be able to transmit and receive data while in a remote location. Additionally, the data technician may use the device to receive transmissions from another network or device through a similar wireless access point. The network interface subsystem 816 may also facilitate the receipt and/or transmission of data on other networks.

The user interface input devices 812 may include one or buttons as illustrated in FIGS. 1-5, a keyboard, pointing devices such as an integrated mouse, trackball, touchpad, or graphics tablet, a scanner, a barcode scanner, a touchscreen incorporated into the display unit, audio input devices such as voice recognition systems, microphones, and other types of input devices. A user of the mobile device may utilize an application within a firmware interface to configure these user interface input devices 812. For instance, in an embodiment, a user of the mobile device can utilize an application within the firmware interface to specify a plurality of display regions that are to be disabled if a user of the mobile devices engages a lock button installed on the mobile device. In general, use of the term "input device" is intended to include all possible types of devices and mechanisms for inputting information to the mobile device system 800.

User interface output devices 814 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the mobile device system 800. The output device(s) 814 may be used, for example, to present user interfaces to facilitate user interaction with applications performing processes descried herein and variations therein, when such interaction may be appropriate.

The storage subsystem 806 may provide a computer-readable storage medium for storing the basic programming and data constructs that may provide the functionality of at least one embodiment of the present disclosure. The applications (programs, code modules, instructions) that, when executed by one or more processors, may provide the functionality of one or more embodiments of the present disclosure, may be stored in the storage subsystem 806. These application modules or instructions may be executed by the one or more processors 802. The storage subsystem 806 may additionally provide a repository for storing data used in accordance with the present disclosure. The storage subsystem 806 may comprise a memory subsystem 808 and a file/disk storage subsystem 810.

The memory subsystem 808 may include a number of memories including a main random access memory (RAM) 818 for storage of instructions and data during program execution and a read only memory (ROM) 820 in which fixed instructions may be stored. The file storage subsystem 810 may provide a non-transitory persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

The mobile device system 800 may include one or more batteries 822. The batteries 822 may be used to provide a power supply for the mobile device system 800 and all of the subsystems included therein. The batteries 822 may be comprised of one or more electrochemical cells which may convert chemical energy into electrical energy. The batteries 822 may be disposable (e.g., alkaline batteries) or rechargeable (e.g., lithium-ion, nickel-cadmium, nickel-metal hydride, or any other suitable chemical composition that may enable reusability of the battery) and may fit integrally into the device.

The mobile device system 800 may be of various types including a portable computer device, tablet computer, a workstation, or any other data processing system that may provide portability for a user of the mobile device. Additionally, the device system 800 may include another device that may be connected to the device system 800 through one or more ports (e.g., USB, a headphone jack, Lightning connector, etc.). Due to the ever-changing nature of computers and networks, the description of the mobile device system 800 depicted in FIG. 8 is intended only as a specific example for purposes of illustrating the various embodiment of the mobile device. Many other configurations having more or fewer components than the system depicted in FIG. 8 are possible.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method comprising:
   detecting a lock signal from a mobile device;
   as a result of detecting the lock signal, accessing memory installed on the mobile device to determine one or more functionality features defined by data stored in the memory, and disabling, by firmware of the mobile device comprising executable instructions separate from an operating system of the mobile device, the one or more functionality features of one or more interface devices installed on the mobile device while continuing to display, on a display unit installed on the mobile device, content, at least a portion of which was previously displayed on the display unit, the content from an application of a plurality of applications selectable to be executed on the mobile device;
   in response to user input to the mobile device corresponding to an intent to restore the one or more functionality features of the one or more interface devices, displaying, on the display unit installed on the mobile device, a personal identification number input box usable for entering a personal identification number for restoring the one or more functionality features of the one or more interface devices;
   receiving, from a user of the mobile device using the personal identification number input box, a personal identification number; and
   restoring the one or more functionality features of the one or more interface devices if the received personal identification number matches an expected value stored within the memory installed on the mobile device.

2. The computer-implemented method of claim 1, wherein the lock signal from the mobile device is caused by engagement of a mechanical button installed on the mobile device, engagement of the mechanical button causing a break in a sub-circuit of the mobile device that results in detection of the lock signal.

3. The computer-implemented method of claim 1, wherein the one or more functionality features of the one or more interface devices installed on the mobile device are disabled based at least in part on a configuration of the one or more interface devices through an application accessible through a firmware interface of the firmware.

4. The computer-implemented method of claim 1, wherein the one or more interface devices include a touchscreen element of the display unit installed on the mobile device, a volume button installed on the mobile device, a microphone of the mobile device and a home button installed on the mobile device.

5. The computer-implemented method of claim 1, wherein the one or more functionality features disabled as a result of detecting the lock signal are, when enabled, usable to access administrative content on the mobile device.

6. The computer-implemented method of claim 1, wherein the user input to the mobile device is use of the one or more interface devices installed on the mobile device for which the one or more functional features have been disabled.

7. A device, comprising:
   a housing;
   one or more output devices engaged with the housing so as to be accessible from outside of the housing;
   one or more interface devices engaged with the housing that enable interaction with content;
   memory;
   one or more processors that are operatively coupled with the one or more output devices, the memory, and the one or more interface devices; and
   firmware comprising executable instructions independent of an operating system of the device, the firmware including instructions executable by the one or more processors that as a result of execution by the one or more processors cause the one or more processors to:
      detect a signal, the signal usable to cause one or more features of the one or more interface devices to be disabled;
      as a result of detecting the signal, disable one or more features of the one or more interface devices while continuing to provide, through the one or more output devices, content provided through the one or more output devices prior to detection of the signal, the content from an application of a plurality of applications selectable to be executed on the device, the one or more features being defined in the memory as features to disable as a result of detecting the signal;
      provide, as a result of detecting user input, a prompt for input of credential information;
      receive, through an input device of the device, credential; and
      restore the one or more features as a result of successful verification of the received credential information.

8. The device of claim 7, wherein the signal is created by engaging a mechanical lock button, causing a break in a sub-circuit of the device that results in detection of the signal.

9. The device of claim 7, wherein the one or more features disabled as a result of the signal being detected are, when enabled, usable to access administrative content on the device.

10. The device of claim 7, wherein the credential information is a personal identification number.

11. The device of claim 7, wherein the one or more features of the one or more interface devices are disabled based at least in part on a configuration of the one or more interface devices through an application accessible through a firmware interface.

12. The device of claim 7, wherein the one or more interface devices include a touchscreen element of the one or more output devices engaged with the housing, a volume button, a microphone engaged with the housing and a home button.

13. The device of claim 7, wherein the input device includes a touchscreen that displays a credential information input screen, the credential information input screen displayed as a result of use, by a user of the device, of the one or more interface devices for which the one or more features have been disabled.

14. A non-transitory computer-readable storage medium having collectively stored thereon executable instructions that, as a result of execution by one or more processors of a computing device, cause the computing device to at least:
  access memory of the computing device to determine one or more functionality features, referenced in the memory, of one or more devices installed on the computing device;
  impose, by firmware of the computing device comprising executable instructions that are independent of an operating system of the computing device, restrictions on the one or more functionality features of the one or more devices installed on the computing device based at least in part on detecting a signal on the computing device while continuing to display, on a display installed on the computing device, data, the data from an application of a plurality of applications selectable to be executed on the computing device;
  detect interaction with the computing device;
  cause, as a result of detecting the interaction, a prompt to enter credential information for enabling the one or more functionality features; and
  as a result of having received correct credential information from a user of the computing device, restore the one or more functionality features.

15. The non-transitory computer-readable storage medium of claim 14, wherein the one or more devices include a touchscreen element of the display installed on the computing device, a volume button installed on the computing device, a microphone installed on the computing device and a home button installed on the computing device.

16. The non-transitory computer-readable storage medium of claim 14, wherein the signal originates from engagement of a mechanical lock button installed on the computing device, engagement of the mechanical lock button causing a break in a sub-circuit of the computing device that results in detection of the signal.

17. The non-transitory computer-readable storage medium of claim 14, wherein the interaction is by the user of the one or more devices for which the restrictions have been imposed on the one or more functional features.

18. The non-transitory computer-readable storage medium of claim 14, wherein the credential information is a personal identification number.

19. The non-transitory computer-readable storage medium of claim 14, wherein the one or more functionality features restricted based at least in part on detecting the signal are, when enabled, usable to access administrative content on the computing device.

20. The non-transitory computer-readable storage medium of claim 14, wherein the one or more functionality features of the one or more devices are disabled based at least in part on a configuration of the one or more devices through an application accessible through a firmware interface installed on the computing device.

21. The computer-implemented method of claim 1, wherein disabling the one or more functionality features of the one or more interface devices includes restricting the mobile device from processing a set of inputs from the one or more interface devices, the set of inputs corresponding to the one or more functionality features.

22. The computer-implemented method of claim 1, wherein disabling the one or more functionality features of the one or more interface devices includes causing a region of a touch screen input of the mobile device to be disabled.

* * * * *